(12) United States Patent
Foley

(10) Patent No.: US 7,301,616 B2
(45) Date of Patent: Nov. 27, 2007

(54) METHOD AND APPARATUS FOR OBJECT ALIGNMENT

(75) Inventor: David Foley, Bochum (DE)

(73) Assignee: SPM Instrument AB, Strangnas (SE)

( * ) Notice: Subject to any disclaimer, the term of this patent is extended or adjusted under 35 U.S.C. 154(b) by 67 days.

(21) Appl. No.: 11/073,866

(22) Filed: Mar. 8, 2005

(65) Prior Publication Data

US 2005/0243315 A1 Nov. 3, 2005

(30) Foreign Application Priority Data

Mar. 8, 2004 (SE) .................................... 0400586

(51) Int. Cl.
*G01C 1/00* (2006.01)
(52) U.S. Cl. .................................. 356/141.3
(58) Field of Classification Search .............. 356/141.3
See application file for complete search history.

(56) References Cited

U.S. PATENT DOCUMENTS

| | | | |
|---|---|---|---|
| 3,932,039 A | 1/1976 | Frey | |
| 4,115,007 A | 9/1978 | Thiele et al. | |
| 4,518,855 A * | 5/1985 | Malak | 356/141.3 |
| 4,698,491 A * | 10/1987 | Lysen | 356/152.3 |
| 4,709,485 A | 12/1987 | Bowman | |
| 4,732,472 A * | 3/1988 | Konig et al. | 356/152.3 |
| 4,864,148 A * | 9/1989 | Lysen et al. | 250/559.3 |
| 5,026,998 A * | 6/1991 | Holzl | 250/559.37 |
| 5,596,403 A | 1/1997 | Schiff et al. | |
| 5,698,849 A | 12/1997 | Figueria, Jr. | |

FOREIGN PATENT DOCUMENTS

| | | |
|---|---|---|
| DE | 101 22 321 | 4/2002 |
| EP | 1 154229 | 11/2001 |
| WO | WO 98/05924 | 3/1998 |

* cited by examiner

*Primary Examiner*—Roy M. Punnoose
(74) *Attorney, Agent, or Firm*—Young & Thompson

(57) ABSTRACT

The present invention relates to a method and apparatus for alignment of two mechanical parts. An inventive measuring device has a housing comprising a light source and a detector for detection of light beams. The light source is capable of transmitting a light beam modulated according to a modulation scheme for information transmission. The output of said detector is connected to an interpreter arranged to demodulate a detected light beam and to a signal conditioner arranged to extract the position of impingement of a detected light beam on the detector surface.

25 Claims, 6 Drawing Sheets

METHOD AND APPARATUS FOR OBJECT ALIGNMENT

FIELD OF THE INVENTION

The present invention relates to the alignment of objects in general, and to the alignment of mechanical parts in particular.

BACKGROUND

The use of many mechanical apparatuses includes the attachment of one mechanical part to another, such as e.g. when attaching the shaft of a pump or a blower to the shaft of a motor. When two rotating shafts are attached to each other it is of uttermost importance that the shafts are well aligned, so that vibrations can be avoided. Poor alignment of shafts invariably causes damage, in terms of wrecked bearings, shaft fatigue, gasket leakage etc., and also gives rise to high power consumption.

A method often used in shaft alignment is commonly referred to as the reverse indicator method, in which a light source and a light sensor are mounted on each shaft, the light sensor on one shaft detecting light emitted from the light source on the other shaft. This technique is well known in the art and is described e.g. in U.S. Pat. No. 4,518,855.

SUMMARY

A problem to which the present invention relates is how to improve an apparatus and system for performing alignment of two mechanical parts.

This problem is address by a measuring device for object alignment, said measuring device having a housing comprising a light source and a detector for detection of light beams. The light source is capable of transmitting a light beam modulated according to a modulation scheme for information transmission, and the output of the detector is connected to an interpreter arranged to demodulate a detected laser beam and to a signal conditioner arranged to extract the position of impingement of a detected laser beam on the detector surface.

The problem is further address by an apparatus for aligning a first mechanical part and a second mechanical part, the apparatus comprising a first measuring device attachable to the first part and a second measuring device attachable to the second part. The first measuring device comprises a laser transmitter and a first detector, and the second measuring device comprises a second laser transmitter and a second detector, the first detector for detecting a second laser beam transmitted by said second laser transmitter and the second detector for detecting a first laser beam transmitted by the first laser transmitter. The first and second detectors are arranged to outputting a first and second detection signal, respectively, upon detection of a laser beam. The first laser transmitter is capable of transmitting a laser beam modulated according to a modulation scheme suitable for information transmission. The second measuring device comprises a demodulator connected to the output of the second detector, said demodulator being arranged to demodulate a second detection signal which is modulated according to said modulation scheme.

The problem is yet further addressed by a method for aligning a first mechanical part and a second mechanical part by means of a first measuring device attachable to the first part, and a second measuring device attachable to the second part, the first measuring device comprising a laser transmitter and a first detector, and the second measuring device comprising a second laser transmitter and a second detector. The method comprises emitting, from the first laser transmitter, a first laser beam modulated to carry a message; detecting the first laser beam in the second detector; generating a first detector output signal responsive to said detecting; and demodulating the first detector output signal to retrieve said message.

By the inventive measuring device, apparatus and method is achieved that wireless communication between a first measuring device and a second measuring device can be achieved. Hence, a user of the inventive apparatuses does not need to spend time avoiding a cord connecting the two measuring devices, thus making the measurement procedure more efficient and less frustrating for the user. Furthermore, the stability and reliability of the apparatuses is improved. If the two measuring devices had to be connected by a cable, the risk of the connecting cable becoming overheated is imminent whenever the two mechanical parts are hot, as is often the case with mechanical parts that have recently been stopped.

In one embodiment of the measuring device, the light source is a laser transmitter, the light beam is a laser beam and the detector is for detecting laser beams. Hereby is achieved that the intensity of the emitted light is high. In this embodiment, the laser transmitter can advantageously have a laser diode, said laser diode being connected to a laser driver arranged to feed an anode current ($I_{anode}$) to the laser diode, wherein said laser driver is capable of feeding to the laser diode an anode current modulated according to a modulation scheme for information transmission. Hereby is achieved that modulation of the laser beam is easily achieved. By using a laser diode for emitting the laser beam, the laser transmitter can be small.

In one embodiment of the inventive apparatus, the first laser transmitter is arranged to perform transmission in at least two different transmission modes, wherein in a first transmission mode, the transmitted laser beam is suited for position sensing, and in the second transmission mode, the laser beam is modulated according to the modulation scheme for information transmission. In a corresponding embodiment of the inventive method, the method further comprises the step of emitting a second laser beam from the first laser transmitter. This second laser beam can be emitted before or after the first laser beam. The second laser beam is modulated so as to provide a laser beam suitable for position measurement. This embodiment of the method further comprises the step of detecting, in the second detecting means, the impingement of the second laser beam on the surface of the second detecting means and generating a second detector output signal responsive to said detecting. From the second detector output signal is then extracted the position of impingement of said second laser beam on the surface of the second detecting means. By this embodiment of the inventive apparatus and method is achieved that the modulation of the laser beam can be optimised for the purpose of information transmission when used for information transmission, and for the purpose of position measurement when used for position measurement.

In another embodiment of the present invention, the first laser transmitter of the inventive apparatus is arranged to transmit a laser beam modulated according to a modulation scheme suitable for information transmission and position sensing. In a corresponding embodiment of the inventive method, the method further comprises extracting, from said first detector output signal, the position of impingement of the first light beam on the surface of the second detector.

Hereby is achieved that the first laser transmitter need only transmit in one transmission mode, making the measurement procedure faster.

In one embodiment of the inventive measuring device, the output of the detector is connected to the interpreter and to the signal conditioner in parallel. In this embodiment, the interpreter and the signal conditioner can operate simultaneously.

In an embodiment of the inventive apparatus, the second measuring device may further comprise a second signal conditioning means connected to the output of the second detecting means and a second processor connected to the output of said second signal conditioning means. The second signal conditioning means can be arranged to extract a signal responsive to the position of the first laser beam on the surface of the second detecting means, the signal being in a format readable by the second processor. The conditioning means and demodulating means can in this embodiment operate simultaneously. The inventive method may comprises the step of extracting, from the first detector output signal, the position of impingement of the first laser beam on the surface of the second detecting means.

In one embodiment of the measuring device, the measuring device further comprises a processor wherein a first input of said processor is connected to the output of said interpreter and a second input is connected to the output of the signal conditioner. The processor is arranged to receive a demodulated message from the interpreter and to receive position measurement results from the signal conditioner. Hereby is achieved that the output from the signal conditioner and the controller can easily be collected analysed by the processor, or forwarded to another processor. In order to keep the costs of manufacturing processing means low, the processor can be a micro-controller.

In one embodiment of the measuring device, the laser transmitter is arranged to emit a laser beam of line shape and the detector is a line shaped detector. Hereby is achieved that the detector surface can be kept small and hence the cost of manufacturing the measuring device can be kept low.

In one embodiment of the measuring device, the measuring device further comprises an inclinometer arranged to indicate the angular position of a mechanical part to which the measuring device is attached. Hereby is achieved that when mechanical parts that are to be aligned by use of the measuring device are rotated in order to obtain another measuring point, the rotation of the mechanical parts can be measured.

In one embodiment of the present invention, the first measuring device of the inventive apparatus comprises a first processor and a first laser driver. The first laser driver is arranged to receive, from the first processor, instructions regarding the transmission of a laser beam, to generate an anode current ($I_{anode}$) in response to said instruction and to feed said anode current to a laser diode of the first laser transmitter. In this embodiment of the invention, the first measuring device of the inventive method further comprises a first processor and a first laser driver. The method further comprises receiving, in the first laser driver from the first processor, an instruction to transmit said message; generating, in said laser driver, an anode current ($I_{anode}$) modulated to cause, when fed to the first laser transmitter, a laser diode of the first laser transmitter to emit said first laser beam; and feeding said anode current to said laser diode. By this embodiment of the invention is achieved that a processor can instruct the laser transmitters to modulate the laser beam for information transmission, thus enabling a user of the inventive apparatus to control the apparatus via a computer interface.

A system for alignment of mechanical parts can preferably be achieved by arranging one inventive measuring device for attachment on one mechanical part and another measuring device for the attachment on another mechanical part, one of the measuring devices being connected to a further processor having a user interface and being connected to a display and set of keys. The inventive apparatus is preferably connected, via one of the measuring devices, to a further processor comprising a user interface. The inventive method preferably comprises the steps of receiving, in the first measuring device, measurement instructions from a further processor; and sending the results of the step of extracting the position to said further processor. Hereby is achieved that the user of the inventive apparatus can easily control the measurement process and retrieve the measurement data. The processing power of any processor in the measuring devices can be comparatively small and without user interface, thus keeping the size of the measuring devices low. In one embodiment of the invention, the further processor is also arranged to perform vibration analysis in order to detect misalignment of the mechanical parts. Hereby is achieved a system for misalignment detection as well as for aligning.

The inventive method, measuring device and apparatus can advantageously be used for shaft alignment, but can also be used in many other scenarios, such as for the alignment of other parts of mechanical instruments, e.g. spindles or bores.

DETAILED DESCRIPTION

Figure 1:
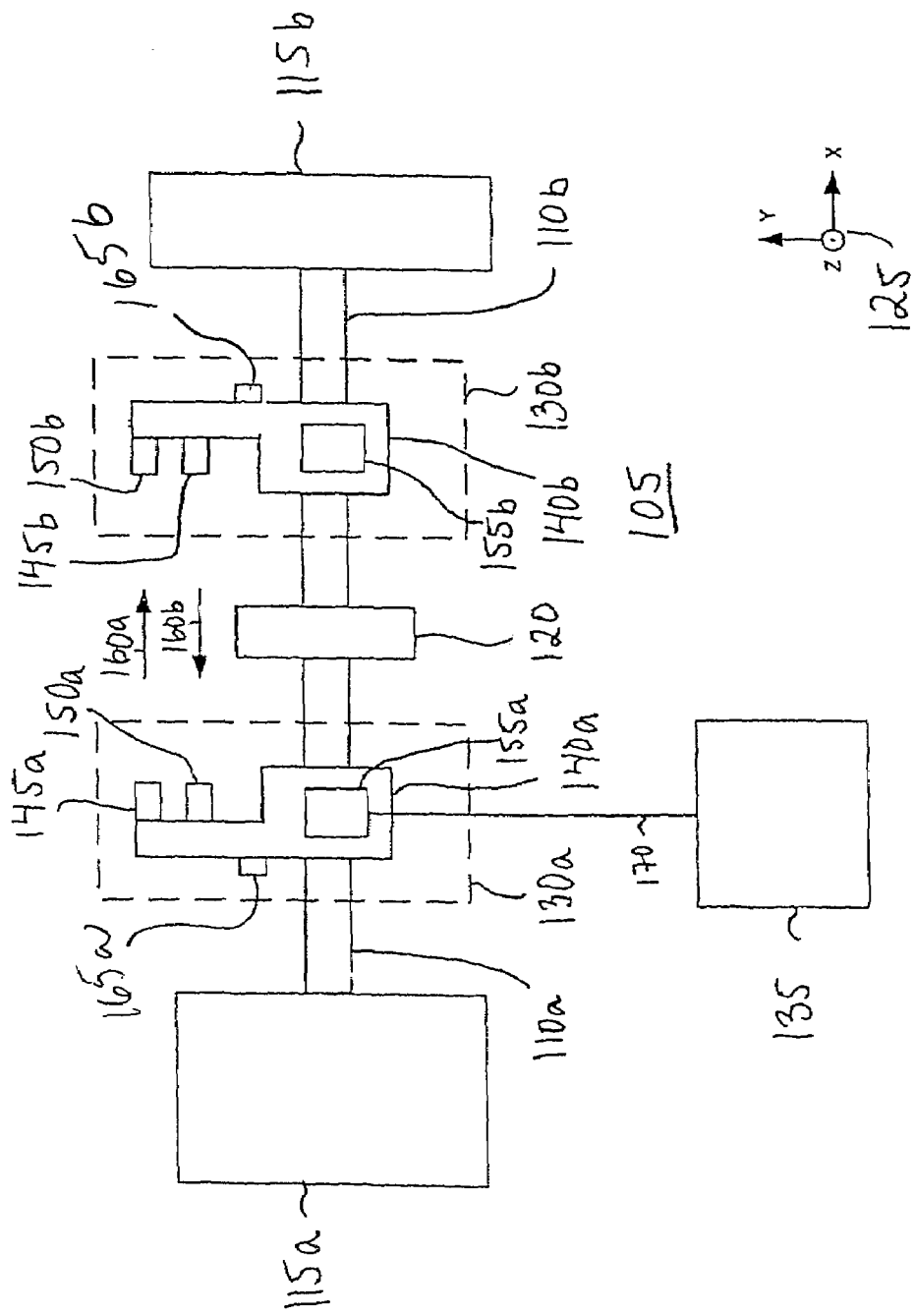
FIG. 1 is a block diagram schematically illustrating a system for shaft alignment.

A schematic block diagram of a system 105 for alignment of mechanical parts is shown in FIG. 1. For purposes of illustration only, system 105 is shown in a situation where shaft 110a of a machine 115a is attached to shaft 110b of a machine 115b by means of connection-box 120. For illustration purposes, a Cartesian co-ordinate system 125 having X-, Y- and Z-axes is also shown in FIG. 1, the X-axis of co-ordinate system 125 being parallel to at least one of the shafts 110a and 110b. System 105 comprises measuring devices 130a and 130b and processor 135. Measuring devices 130a and 130b are removably attached to shafts 110a and 110b, respectively. Measuring devices 130a and 130b of FIG. 1 each comprises a body 140a and 140b, respectively. On body 140a are mounted a light source 145a and a detector 150a, while on body 140b are mounted a light source 145b and a detector 150b. Measuring devices 130a and 130b of FIG. 1 each further comprises a controller 155a and 155b, respectively. Processor 135 preferably comprises a user interface.

When performing measurements of the alignment of shafts 110a and 110b, light sources 145a and 145b can each transmit a light beam, referred to as light beam 160a and 160b, respectively. Light sources 145a and 145b could preferably each have a laser diode, although any light sources 145a and 145b of high intensity, such as e.g. gas lasers or high intensity light emitting diodes (LEDs), could be used. Light sources 145a and 145b could have any light emitting characteristics, although many users of system 100 would prefer a light beam 160 in the visible part of the spectrum. If necessary, optical lenses can be used to focus the light beam on detector 150. Detector 150b detects the position of impingement of light beam 160a on the surface of detector 150b. Detector 150a similarly detects the position of impingement of light beam 160b on the surface of detector 150a. Detectors 150a and 150b can each generate a signal responsive to the position of impingement of light beams 160b and 160a, respectively. The signals from detectors 150a and 150b jointly provide information about the misalignment of shafts 110a and 110b in the Y-Z-plane of co-ordinate system 120, this information being indicative of adjustments needed of the relative position of shafts 110a and 110b in order to achieve alignment of the centre line of shaft 110a and the centre line of shaft 110b. Detectors 150a and 150b may also detect other properties of light beams 160b and 160a, such as intensity. Preferably, the shafts 110a and 110b connected with connection box 120 are rotated, and measurements taken at three or more angular positions of shafts 110a and 110b in order to obtain information about adjustments needed of the relative position of shafts 110a and 110b. As a complement to detectors 150a and 150b, system 105 may advantageously comprise an inclinometer 165, indicating the angular position of shafts 110a and 110b as the shafts 110a and 110b are rotated. The inclinometer 165 can advantageously be implemented as an inclinometer 165a on measuring device 130a and an inclinometer 165b on measuring device 130b.

In the following description, light sources 145a and 145b will be described in terms of laser transmitters 145a and 145b, although is should be understood that any light source of sufficient intensity could be used. Laser transmitters 145a and 145b could e.g. emit laser beams 160 of point shape, or line shape. A line shaped laser beam 160 is generally easier to centre, while a point shaped laser beam requires a larger detector surface in order to ensure proper detection. Detectors 150 could be dual axis detectors, or single axis detectors. When using a line shaped laser beam 160, detector 150 could preferably also be of line shape, the lines formed by the laser beam 160 and the line formed by detector 150 advantageously being perpendicular to each other in order to ensure that the laser beam 160 will impinge detector 150.

Detectors 150 could advantageously be dual axis Position Sensitive Detectors (PSD) providing a detector signal comprising two signals in response to illumination of the detector surface, the magnitude of said two signals being equal when the laser beam 160 is centred on the detector surface. The two signals generated by a dual axis PSD in response to the impingement of a laser beam 160 could be two currents, $I_1$ and $I_2$, where the magnitude $H_1$ of $I_1$ increases and the magnitude $H_2$ of $I_2$ decreases when the position of impingement is closer to a first side of the detector, while the magnitude $H_1$ of $I_1$ decreases and the magnitude $H_2$ of $I_2$ increases when the position of impingement is closer to a second side of the dual axis PSD. The magnitudes $H_1$ and $H_2$ yield the position of impingement, p, according to $p=k(H_1-H_2)/(H_1+H_2)$, where k is a constant. However, instead of detectors 150 being dual axis PSDs, detectors 150 could be single axis PSDs, or any other type of detectors capable of detecting the position of a laser beam, such as e.g. CCD (Charged Coupled Device) detectors. Measurements performed by system 100 operating according to the reverse indicator method, in which a detector on one measuring device detects a laser beam emitted from the other measuring device and vice versa, yields very accurate measurement results.

In order for controllers 155a and 155b to receive instructions from processor 135 and to communicate measured data to processor 135, controllers 155a and 155b need to be connected to processor 135. Since the operation of system 105 often involves manual adjustment of the relative position of shafts 110a and 110b, any cords connecting a measuring device 130a or 130b to other equipment will make the alignment process more cumbersome and time consuming. Rather than having both controllers 155a and 155b directly connected to processor 135, controllers 155a and 155b can be interconnected via a cable, one of controllers 155a and 155b being capable of communicating the measurement results from both controllers 155a and 155b to processor 135. In FIG. 1, a connection 170 connects measuring device 130a to processor 135. Thus, processor 135 will only have to communicate with one of controllers 155a and 155b, making the communication interface of processor 135 simpler. However, the cable interconnecting the two controllers 155 is often in the way when attaching the measuring device 130 onto a shaft 110 and when performing measurements. Furthermore, since the shafts 110 often get very hot when the machines 115 are in use, there is an immediate risk of the cable interconnecting the two controllers 155 becoming overheated when performing measurements shortly after the machines 115 have been in use.

According to the present invention, controllers 155a and 155b communicate with each other by means of light sources 145 and detectors 150. Not only are light sources 145 and detectors 150 used for performing measurements, but they are also used for transmitting information such as measurement results and/or instructions etc. from one measurement device 130 to the other measurement device 130. In this way, no interconnecting cable between controllers 155a and 155b is needed, while communication between processor 135 and controllers 155 and 155b can be achieved with only one of controllers 155a and 155b being connected to processor 135.

Since controller 155a 130a of FIG. 1 is connected to processor 135 while controller 155b is not, measuring device 130a will be referred to as the master measuring device 130a, whereas measuring device 130b will be referred to as the slave measuring device 130b. Connection 170, connecting the master measuring device 130a to processor 135, can be implemented as a bluetooth connection, a standard data communication link, or any other wired, or wireless, connection capable of transferring data. In order to reduce the number of wire connections of system 105, measuring device 130b advantageously includes a local power source, such as a battery. Similarly, a battery for the supply of power to measuring device 130a can be included in measuring device 130a.

Figure 2:
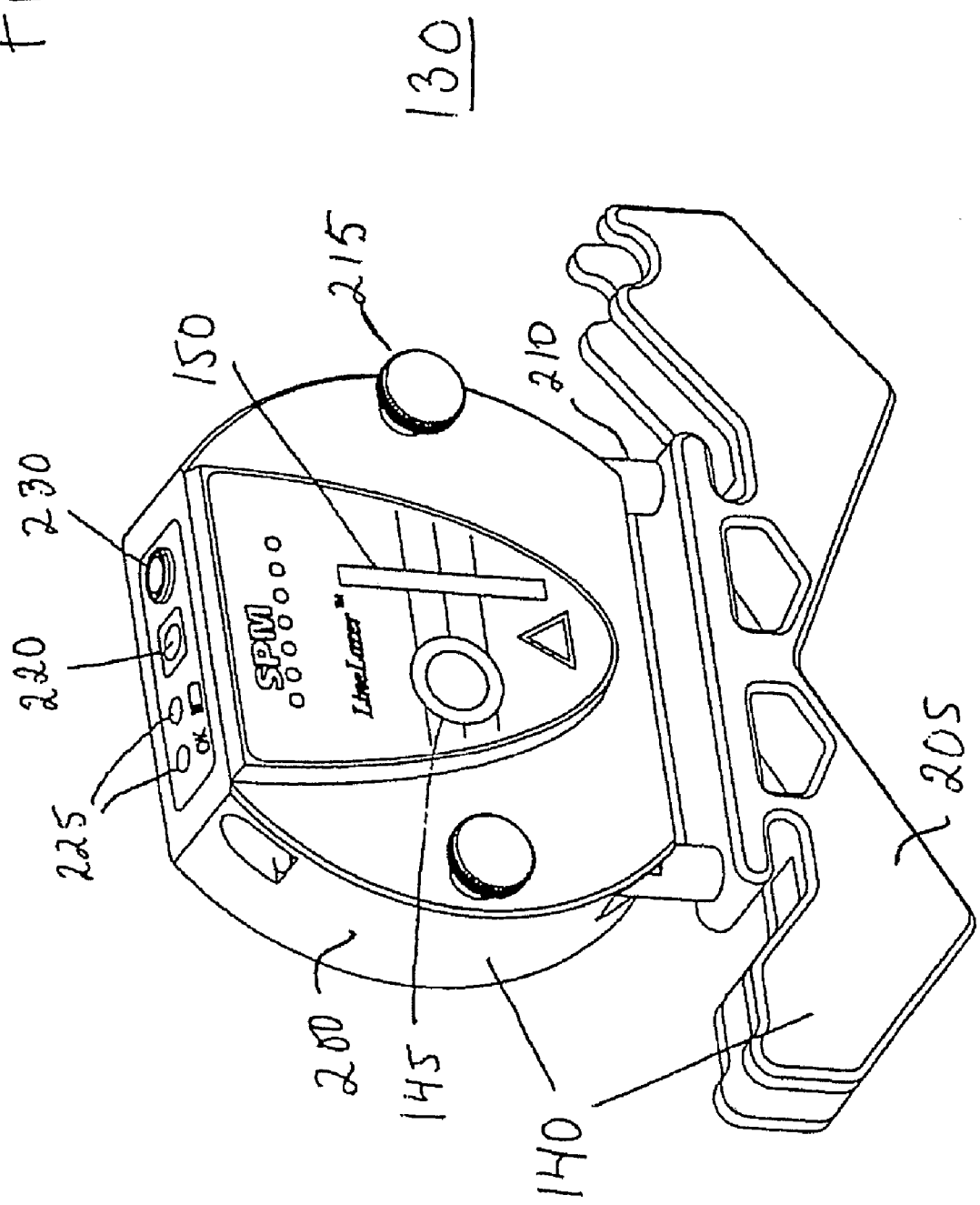
FIG. 2 illustrates an exemplary measurement device.

FIG. 2 illustrates an exemplary measuring device 130. Body 140 comprises a housing 200 and a v-shaped holder 205 for holding housing 200 on a shaft 110. Holder 205 could be strapped onto shaft 110 by use of e.g. a chain. Holder 205 comprises two cylindrical fastening devices 210, onto which housing 200 can be mounted and fastened by means of two screws 215. Cylindrical fastening devices 210 can easily be mounted and demounted from holder 205, so that cylinder fastening devices 210 of different lengths can be used when adjustment of the distance between shaft 110 and housing 200 is desired. On housing 200 are mounted a laser transmitter 145 and a detector 150, the detector 150 being a dual axis PSD. Laser transmitter 145 of FIG. 2 comprises a laser diode which emits a laser beam of 650 nm. Furthermore, housing 200 has an on-off switch 220, light emitting diodes 225 for indicating the status of the measuring device and an I/O 230 for battery charging and for communication with processor 135, if desired. Measuring device 130 of FIG. 2 comprises an inclinometer 165, mounted inside housing 200. Obviously, measuring device 130 could be implemented in many different ways. Many other means of fastening body 140 onto shaft 110 could be used, such as e.g. a magnetic holder, and housing 200 and holder 205 could be integrated. Both the master measuring device 130a and the slave measuring device 130b of FIG. 1 can advantageously be implemented similarly to the measuring device 130 of FIG. 2.

By enabling the processor 135 to communicate with the slave measuring device 130b via the master measuring device 130a without any cord connection between the slave and master measuring devices 130, the use of system 105 for shaft alignment is made more efficient, since the operator of system 105 does not have to think about avoiding any cable interconnecting the measuring devices 130a and 130b when performing his work. Furthermore, the risk of failure of system 105 is reduced considerably, since the risk of overheated cables is reduced.

When the laser transmitters 145 and detectors 150 are used for position measuring purposes, the laser beams 160a and 160b can advantageously be amplitude modulated in order for disturbances from ambient light sources to be reduced.

In order to enable data transmission between controllers 155a and 155b by means of laser beams 160a and 160b, laser beams 160a and 160b could be further modulated at the light source. Such further modulating of laser beams 160a and 160b for data transferring purposes could e.g. be performed by transmitting laser beam 160 as pulses, and modulating the pulse pattern according to a modulation scheme such as phase modulation, Pulse Width Modulation (PWM), frequency modulation or Frequency-Shift-Keying (FSK). Amplitude modulation of the laser beam 160 could also be used. If the laser transmitter 145 has a laser diode, modulation of the laser beam can be achieved by modulating the anode current, $I_{anode}$, fed to the laser diode of laser transmitter 145. If a modulation scheme based on amplitude modulation is used for the transmission of messages, the frequency of the amplitude variations in this modulation scheme should preferably be well separated from the frequency of any amplitude modulation for reducing disturbances from ambient light. As an alternative to modulating the laser beam at the light source, the laser beam could be modulated by means of putting an object with variable optical characteristics in the transmission path of laser beam 160. Such an object could be included in the laser transmitters 145a and 145b and mounted in front of the laser beam output, and could e.g. be a crystal having voltage controllable optical characteristics. Modulation of a voltage applied to the crystal would then yield a modulation of the optical characteristics of the crystal and hence a modulation of the laser beam 160. Yet another way of modulating the laser beam could be to alter the frequency of the emitted laser light according to a modulation scheme. Laser modulation for information transmission purposes is further described in Chapter 8 of the publication "Signals and Systems" (2$^{nd}$ edition) by Alan V. Oppenheimer, hereby incorporated by reference. When other light sources than lasers are used, the light beam can be emitted as pulses. The pulse pattern can be modulated according to a modulation scheme such as phase modulation, Pulse Width Modulation (PWM), frequency modulation or Frequency-Shift-Keying (FSK). The pulse pattern can be achieved either at the light source, or by placing an object with variable optical characteristics in the path of the light beam.

Figure 3:
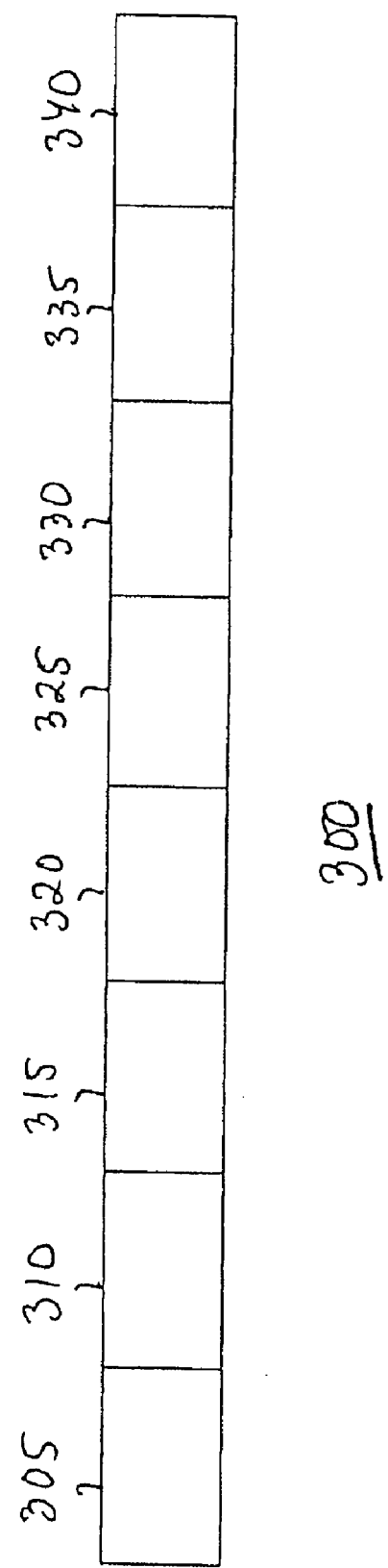
FIG. 3 is an example of a message structure that can be used for transmission of information within a system for shaft alignment.

The information to be transferred from controller 155b of the slave measuring device to controller 155a of the master measuring device could e.g. comprise one or several of the following data: detected position of the laser beam 160a on the surface of detector 150b, measured intensity of laser beam 160a, temperature, inclination measured by inclinometer 165b, battery voltage, an instruction to repeat the transmission of a message or a laser beam for measurement purposes, or any other information. This information can either be processed by master controller 155a, or forwarded by master controller 155a to the processor 135. Preferably, master measuring device 130a is also able to transfer information to the slave measuring device 130b. Such information could e.g. comprise an instruction to provide a position measurement result, instruction to provide an inclination measurement result, instruction to perform inclinometer calibration, instruction to provide a laser beam 160b suitable for position measurement, instruction to perform measurement of temperature or battery voltage etc. In order to simplify the processor 135 and controllers 155a and 155b, an unsynchronised transmission protocol in which the reply to a query is sent at an arbitrary point in time can advantageously be used for the transmission of messages 300 within system 105. A schematic example of a message 300 which could be used for transmitting information within system 105 is shown in FIG. 3. Message 300 of FIG. 3 comprises a data field 305 for the receiver address, a data field 310 for the sender address, a data field 315 indicating the number of data packages sent, a data field 320 indicating the relevant command, a data field 325 for data to be transmitted, and a data field 330 for a checksum. Obviously, message 300 could be designed in any suitable manner and any protocol for transferring information could be used. Furthermore, different protocols could be used for the transmission of information between the processor 135 and a controller 155 and for the transmission of information between controllers 155.

Figure 4:
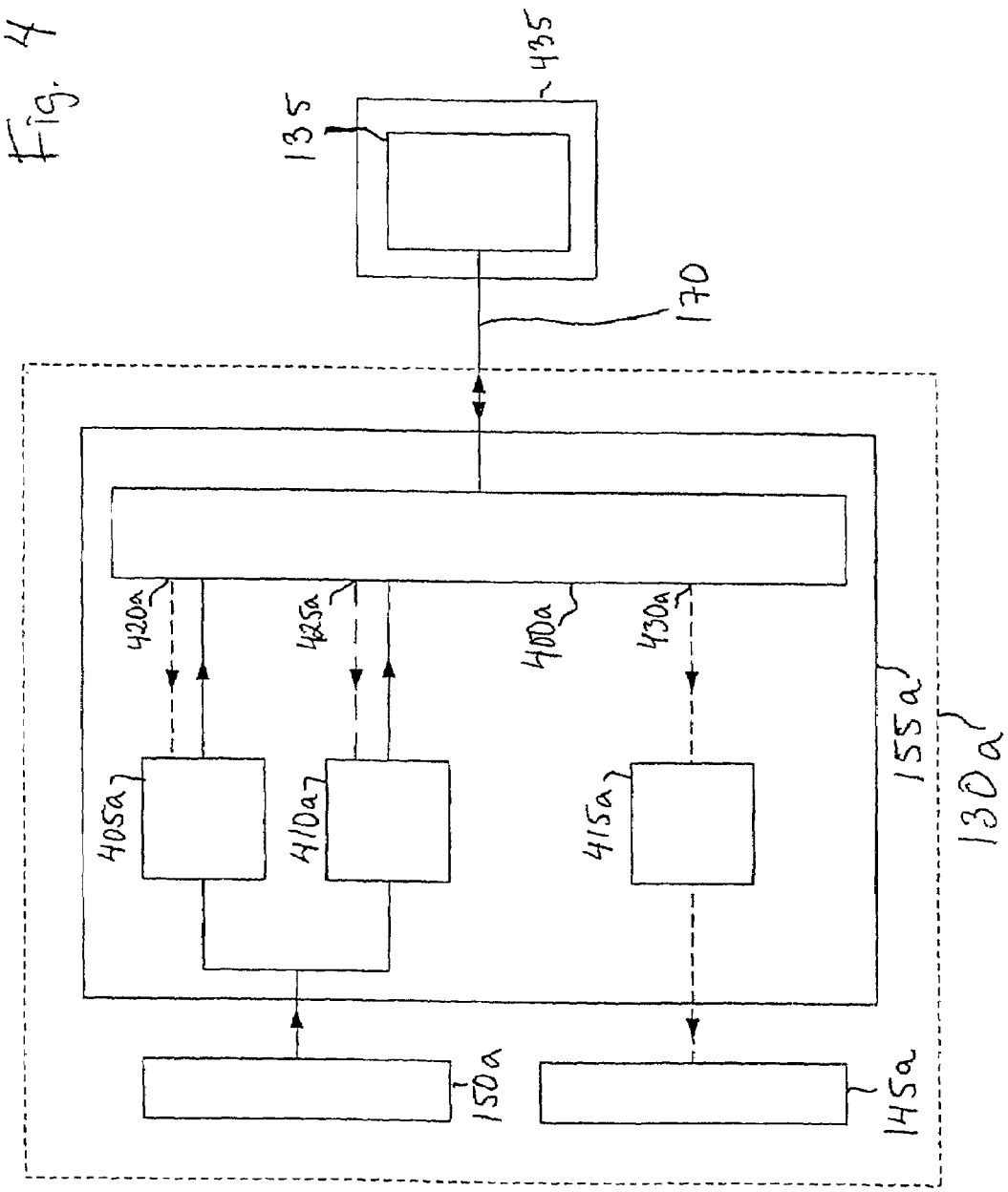
FIG. 4 is a schematic block diagram illustrating a measuring device connected to a processor means.

In FIG. 4, a schematic block diagram of master measuring device 130a is shown, wherein measuring device 130a is connected to processor 135 via connection 170. Master controller 155a of measuring device 130a is connected to laser transmitter 145a, detector 150a and processor 135. Controller 155a of FIG. 4 comprises processor 400a, signal conditioner 405a, interpreter 410a, and laser driver 415a. In the embodiment illustrated in FIG. 4, the signal conditioner 405a and interpreter 410a are connected in parallel to the output of detector 150a. In other embodiments, the signal conditioner 405a and the interpreter 410a could be connected in series, so that the output signal from the detector 150a is first processed by the signal conditioner 405a and then by the interpreter 410a, or vice versa.

The output of interpreter 410a is connected to an input of processor 400a, and the output of signal conditioner 405a is advantageously connected to another input of processor 400a. Processor 400a preferably has signalling outputs 420a, 425a and 430a connected to signal conditioner 405a, interpreter 410a and laser driver 415a, respectively, from which instructions to signal conditioner 405a, interpreter 410a and laser driver 415a can be sent. Processor 400a is also connected via a dual direction communication line to processor 135. Controller 155a may also comprise storage means for storing data.

Upon operation of system 105, signal conditioner 405a receives the output signal from detector 150a. Signal conditioner 405a advantageously comprises circuitry for extracting, from the output signal from detector 150a, the position of the laser beam 160b on the surface of detector 150a. Signal conditioner 405a furthermore preferably comprises analogue-to-digital conversion circuitry so that the extracted position result can be output to processor 400a as serial data.

Interpreter 410a is connected to detector 150a in parallel to signal conditioner 405a, and hence also receives the output signal from detector 150a upon operation of system 105. Interpreter 410a advantageously comprises circuitry for demodulating the output signal from detector 150a, and circuitry for passing the demodulated output signal on to processor 400a as serial data. The design of interpreter 410a obviously varies depending on the modulation scheme used by laser transmitter 145b. For example, if laser beam 160b is modulated according to the frequency modulation scheme used by standard infrared (IR) remote controllers, interpreter 410a could e.g. be a standard IR circuitry normally used in conjunction with such remote controllers.

Processor 400a preferably has the capability of interpreting the demodulated output signal from interpreter 410a as a message 300. Upon reception of a demodulated output signal in the format of a message 300 from interpreter 410a, processor 400a preferably checks data field 205 for the receiver address to see whether the message 300 should be read, or forwarded to e.g. Processor 135. Processor 400a is advantageously further capable of sending instruction messages to signal conditioner 405a and interpreter 410a, via outputs 420a and 425a, respectively.

Processor 400a preferably has a signalling output 430a connected to laser driver 415a, from which instructions to laser driver 415 can be sent. Such instructions can advantageously be in the form of a TTL stream, and can include any information that should be transmitted by laser transmitter 145a and/or instructions to transmit a laser beam 160a suitable for measurements. When laser transmitter 145 has a laser diode, laser driver 415a advantageously comprises circuitry for generating a modulated current, $I_{anode}$, in response to the instructions received from processor 400a, such circuitry including digital-to-analogue conversion circuitry for conversion of the digital signal from processor 400a into an analogue signal to be sent to laser transmitter 145a. The generated current, $I_{anode}$, can be fed to the anode of the laser diode of laser transmitter 145a, thus causing the laser diode to emit the desired laser beam 160a. However, if modulation of the laser beam is performed in a different way, laser driver 415 should operate accordingly. For example, if modulation of the laser beam is achieved by modulating the optical characteristics of a crystal with voltage controllable optical characteristics placed in the path of the laser beam, the laser driver 415 should advantageously comprise circuitry for generating a voltage modulated in accordance with the instructions received from processor 400a, such circuitry including digital-to-analogue conversion circuitry for conversion of the digital signal from processor 400a into an analogue signal to be sent to laser transmitter 145a.

The division of processing power between processor 400a and processor 135 can be made such that the processing power of processor 400 is rather limited. Hence, processor 400a can be mainly for directing instructions from processor 135 to laser transmitters 145a and 145b, and directing measurement data from measuring devices 130a and 130b to processor 135. Or, laser driver 415a, interpreter 410a and signal conditioner 405a could communicate directly with processor 135 without the need for a processor 400a. Alternatively, processor 400a could e.g. comprise functionality for processing data, such as functionality for computing average values of measured data etc. Processor 400 could e.g. be a µ-controller or a µ-processor. Processor 135 could preferably provide a user interface for retrieving data and for setting parameters of the measurement procedure, such as measurement duration, conditions for any averaging of measured values, etc. Processor 135 should therefore preferably be further connected to I/O device such as a display or computer screen, and a keyboard or set of keys. Processor 135 could advantageously be part of an analysis apparatus 435, where analysis apparatus 435 is arranged to perform vibration analysis for detection of shaft misalignment as well as to process measurement results from measuring devices 130a and 130b. Analysis of the vibrations of machines 115a and 115b can be performed from time to time, using vibration measurement results obtained by use of vibration measurement devices, detecting any need for re-alignment of shafts 110a and 110b. Analysis apparatus 435 could also be further arranged to perform other measurements and analyses relating to machine conditioning, such as e.g. vibration analysis of other machines or other parts of machines 115a and 115b, shock pulse measuring and imbalance detection. An example of an analysis apparatus 435 is described in WO03/062768, hereby incorporated by reference.

Slave controller 155b could be designed in a manner very similar to master controller 155a, and is therefore not discussed in detail. Slave controller 155b could preferably comprise a processor 400b, signal conditioner 405b, interpreter 410b and laser driver 415b, connected in a similar fashion as in FIG. 4. However, processor 400b does normally not comprise a connection to processor 135, and does therefore normally not need the functionality for communicating with processor 135.

Figure 5:
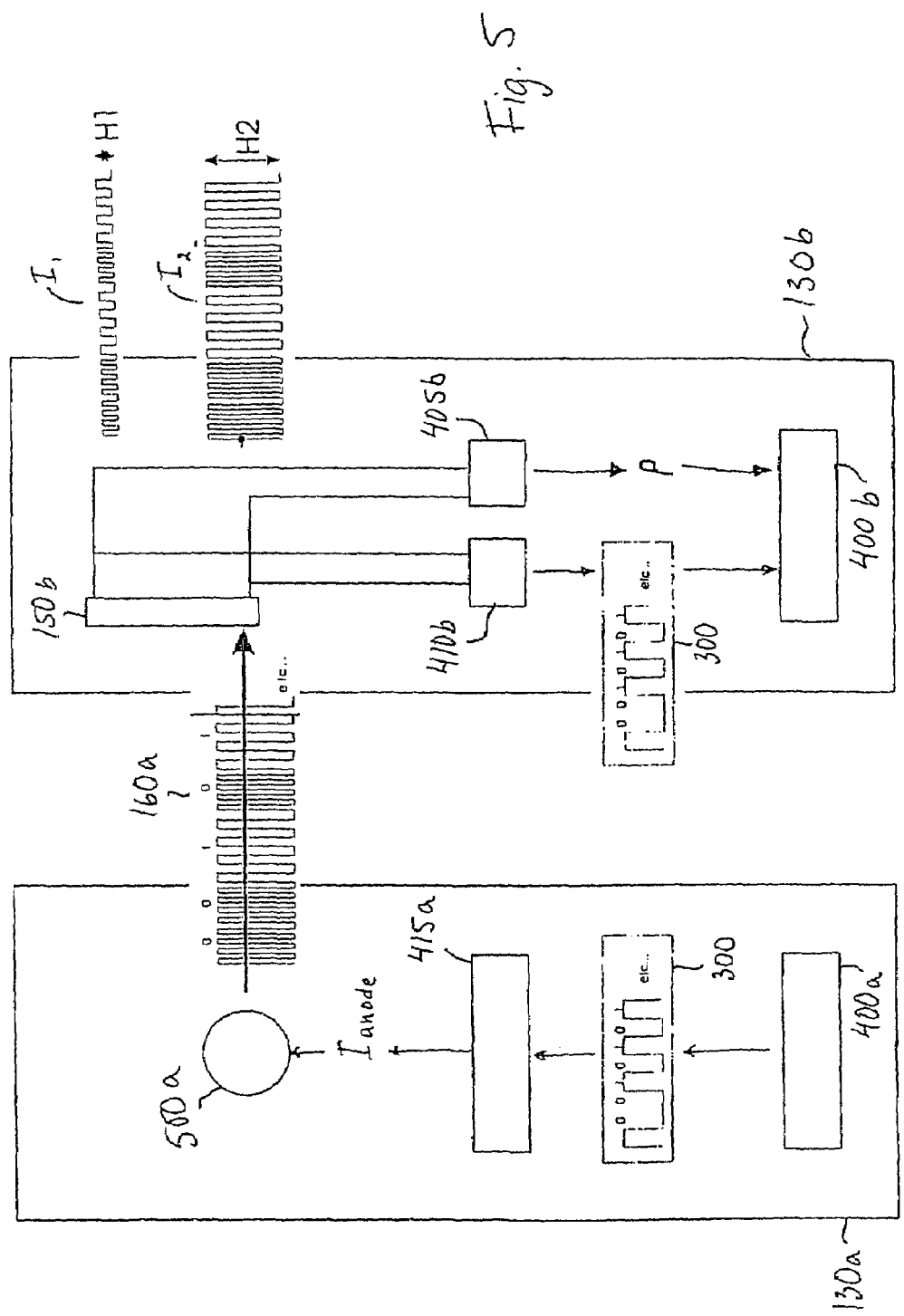
FIG. 5 illustrates an embodiment of the invention using frequency shift keying.

FIG. 5 provides an illustration of how a message 300 is transferred between two measuring devices 130 in an embodiment of the invention where frequency key shifting of laser beams 160 is used. For illustration purposes, measuring device 130a is illustrated to be the transmitting measuring device, while measuring device 130b is illustrated to be the receiving measuring device. Only features of measuring device 130a which are involved in the transmission of information, and features of measuring device 130b which are involved in the reception of information and performance of measurement, are included in the schematic illustration of FIG. 5. Obviously, measuring device 130a could preferably include the features of measuring device 130b in FIG. 5, and vice versa.

In FIG. 5, processor 400a provides laser driver 315a with a message 300 which is to be transmitted to measuring device 130b. The binary message 300 is shown in FIG. 5. Laser driver 415a then feeds an anode current $I_{anode}$ to the laser diode 500a, the anode current $I_{anode}$ being modulated according to the contents of message 300. Laser diode 500 then emits a laser beam 160a which is frequency shift key-modulated illustrated by four pulses transmitted at high frequency representing "0" and four pulses transmitted at lower frequency representing "1". The frequency of the pulses could e.g. be 50 kHz at high frequency and 5 kHz at low frequency. Obviously, the frequency shift keying could be implemented using any number of pulses to represent a "0" or a "1", and the two frequencies could be any two frequencies that can easily be distinguished from each other. The frequency of the light source could e.g. be 650 nm.

The output currents from the detector 150b, $I_1$ and $I_2$, respectively representing the distance from the top and bottom ends of the detector 150b to the position of impingement of the laser beam 160a, are also shown in the FIG. 5. In the figure, the position of impingement of laser beam 160a on the surface of detector 150b is illustrated to be near the end of detector 150b yielding a large magnitude $H_2$ of $I_2$ and a small magnitude $H_1$ of $I_1$. The magnitude $H_1$ of $I_1$ is thus shown to be smaller than the magnitude $H_2$ of $I_2$. The two signals $I_1$ and $I_2$ are fed in parallel to the inputs of signal conditioner 405b and interpreter 410b, respectively. In signal conditioner 405b, the position p of impingement of laser beam 160a on the surface of detector 150b is extracted from the two signals $I_1$ and $I_2$, and transmitted as a serial value to processor 400b. In interpreter 410b, the signals $I_1$ and $I_1$ are demodulated in order to retrieve the message 300 transmitted from processor 400a. Message 300 is then fed to processor 400b.

In FIG. 5, an embodiment in which the laser beams 160 are modulated according to phase shift keying is illustrated. A pulse pattern emitted from laser transmitter 145a can obviously be modulated according to other modulation schemes, such phase modulation, pulse width modulation, amplitude modulation and frequency modulation. By frequency modulation is here meant that more pulse emitting frequencies than two are used, each representing a code word longer than one bit.

Figure 6:
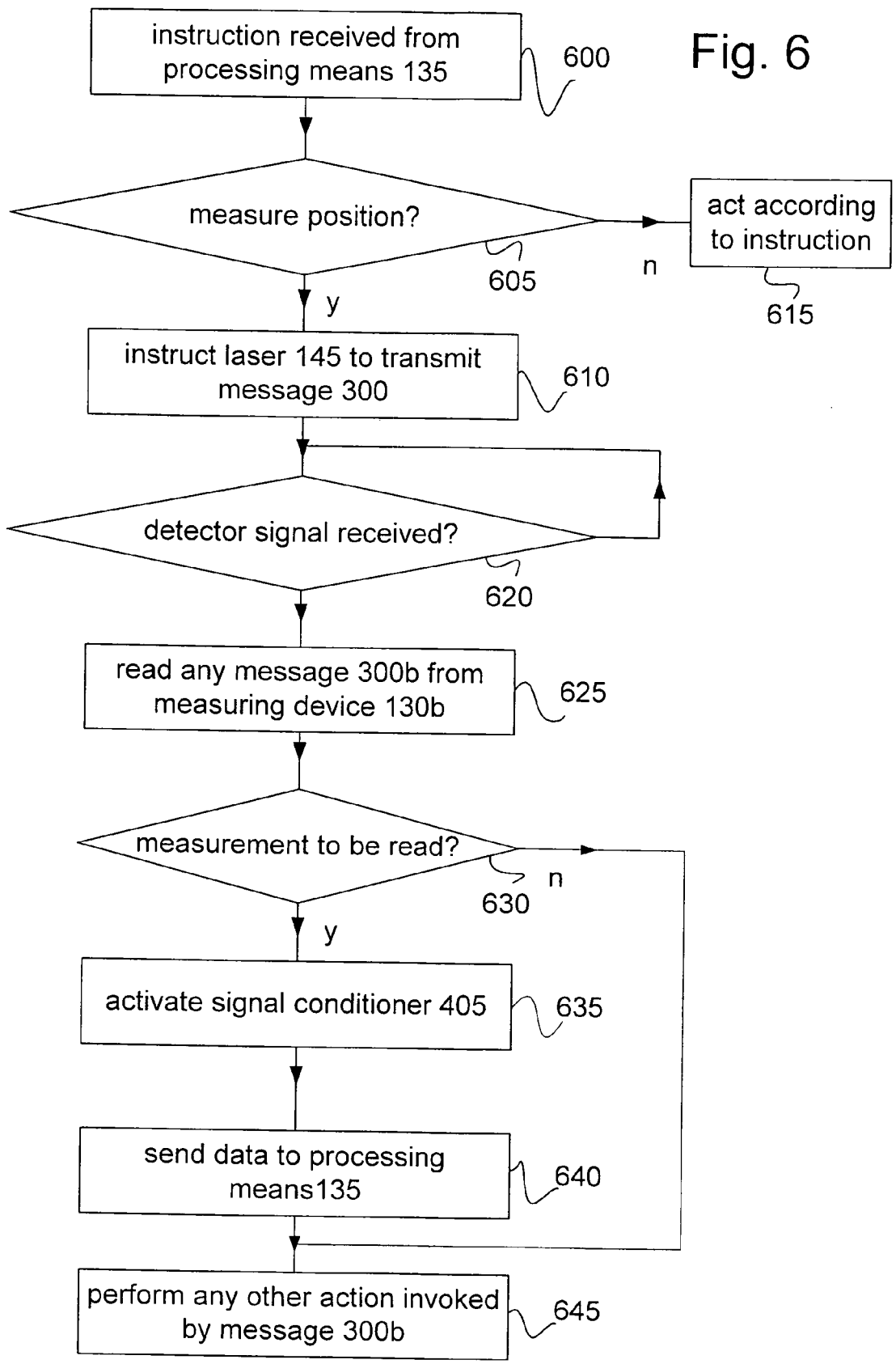
FIG. 6 is a schematic flow diagram illustrating an exemplary measurement procedure performed by a system for shaft alignment.

FIG. 6 is a flowchart schematically illustrating an example of a procedure performed by system 105 in terms of actions performed by processor 400a of controller 155a. In step 600, an instruction is received by processor 400a from processor 135. The instruction can e.g. be formatted according to the message structure of message 300 shown in FIG. 2. In step 605, the contents of the is instruction is checked. If the instruction contains an instruction to perform a position measurement, step 610 is entered. However, if the instruction does not relate to position measurement, step 615 is entered, in which actions are taken according to the contents of the instruction.

In step 610, laser transmitter 145a is instructed, via laser driver 415a, to transmit a message 300a to measuring device 130b. The message 300a could comprise instructions to measuring device 130b to i) measure and report the position of the laser beam 160a transmitted by laser transmitter 145a, and ii) transmit a laser beam 160b which can be used for position measurements by measuring device 130a. Alternatively, processor 400a can instruct laser transmitter 145a to send the instructions i) and ii) in two different messages 300a, or, if the instruction received in step 600 only concerns position measurement performed by one of the measuring devices 130a and 130b, processor 400a can instruct laser transmitter 145a to transmit a message 300a containing the relevant instruction i) or ii).

In one embodiment of the present invention, measuring device 130a can operate in a mode so that laser beam 160a is modulated so as to simultaneously transmit the relevant message to measuring device 130b and provide adequate illumination of detector 150b of measuring device 130b for measuring device 130b to perform position measurements. In this mode, instruction i) only could be sent to measuring device 130b. Measuring device 130a can then perform measurements on the signal transmitted by laser transmitter 145b containing information on the results of the performed measurement. In this mode, laser transmitter 145a may transmit one or several dummy messages as well as the message intended for the measuring device 130b, so as to give measuring device 130b ample time to perform position measurements. Dummy messages could also be used in order to facilitate for the user of system 105 to perceive the laser beam 160a on the surface of detector 130b. In some circumstances, it might not be necessary for a user of system 105 to be able to perceive the laser beam. System 105 could therefore be capable of operating in two different transmission-time modes, wherein in the first transmission-time mode, enough dummy messages are transmitted so as to facilitate for a user of system. 105 to perceive the laser beam, and in the second transmission-time mode, the transmission time is optimised for measurements, thus reducing the power consumption of the laser transmitters 145.

In one embodiment of the present invention, laser transmitter 145a can operate in two different modes, so that in one mode, laser beam 160a is modulated for position measurements, and in the other mode, laser beam 160a is modulated to transmit information. If the instruction received in step 600 comprises an instruction to measure the position of laser beam 160a at the measuring device 130b, processor 400a would, in this embodiment, after having instructed laser transmitter 145a to transmit a message 300a to measuring device 130b in step 610, instruct laser transmitter 145a to transmit a laser beam 160a modulated for position measurement purposes. A typical transmission duration time in the measurement mode could be 50 ms, and in the information transmission mode 50 ms, although, naturally, the transmission in any of the two transmission modes could last for any duration of time.

In step 620, processor 400a checks whether a detector signal has been received from detector 150a. If not, step 620 is re-entered. However, if a detector signal has been received, step 625 is entered, in which processor 400a reads any message 300b received from measuring device 130b via interpreter 410a. In step 630, processor 400a checks if a position measurement should be performed by measuring device 130a. A message 300b could include an instruction to measuring device 130a to perform position measurements. Alternatively, position measurements could be initiated by measuring device 130a without a prior message 300b from measuring device 130b containing an instruction to perform a measurement. If position measurements should be performed, step 635 is entered, in which processor 400a activates the signal conditioner 405a. In step 640, processor 400a sends the measurement results to processor 135 upon reception of the measurement results from signal conditioner 405a. Step 645 is then entered, in which any other action invoked by a message 300b received in step 630 are performed. Examples of actions that a message 300b received via interpreter 410a could invoke is e.g. forwarding the contents of message 300b to processor 135, or repeating the transmission of a laser beam 160a suitable for position measurements. Step 645 is entered also if it is found in step 630 that no position measurements should be performed.

Processor 135 can present the data in a suitable form to a user of system 105. Necessary adjustment of the relative position of shafts 110a and 110b can then be performed.

The signal conditioner 405a could be implemented to be active on demand, or to be constantly active, in which case step 635 of FIG. 6 could be omitted.

The flowchart in FIG. 6 schematically illustrates the actions performed by processor 400a upon reception of an instruction from processor 135 to perform a position measurement. The flowchart in FIG. 6 could, in principle, apply also the actions performed by processor 400b in this scenario. The instructions received from processor 135 in step 600 would be received by processor 400b via processor 400a and detector 150b. Step 610, in which the laser transmitter 145 is instructed to transmit a message 300a, would preferably be omitted. Step 640 would preferably include instructing, via laser driver 415b, laser transmitter 145b to transmit a message 300b containing the measurement data.

Upon reception of an instruction from processor 135 to perform a different task, such as e.g. perform a measurement of the battery voltage or read the inclinometer value, the flowchart of FIG. 6 would be altered to accommodate for the different demand.

Obviously, several other steps may be included in the flowchart of FIG. 6, such as e.g. the transmission of acknowledgement messages.

Although in the above description the inventive system and method for alignment has been described in terms of the alignment of two shafts, the system and method for alignment could be used for the alignment of any mechanical parts, such as e.g. spindles or bores.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A measuring device for object alignment, said measuring device having a housing comprising:
   a light source structured and arranged to be capable of generating an output light beam that is modulated according to a modulation scheme for information transmission;
   an incident light beam detector;
   an interpreter connected to the incident light beam detector, the interpreter being structured and arranged to be capable of demodulating an incident light beam as received by the incident light beam detector; and
   a signal conditioner connected to the incident light beam detector, the signal conditioner being constructed and arranged so as to be capable of extracting a position of impingement of the incident light beam on a surface of the detector;
   wherein said interpreter and said signal conditioner are arranged to simultaneously demodulate and extract, respectively.

2. The measuring device of claim 1, wherein said light source is a laser transmitter, the output light beam is a laser beam and the light beam detector is a laser detector.

3. The measuring device of claim 2, wherein the measuring device comprises a laser driver; the laser transmitter comprises a laser diode; an input of the laser diode is connected to an output of the laser driver; the laser driver is arranged to feed an anode current to the laser diode; and wherein said laser driver is capable of feeding to the laser diode an anode current modulated according to a modulation scheme for information transmission.

4. The measuring device of claim 1, wherein the output of said incident light beam detector is connected to the interpreter and the signal conditioner in parallel.

5. The measuring device of claim 1, further comprising: a processor having first and second inputs, the first input being connected to an output of said interpreter, the second input being connected to an output of said signal conditioner, and said processor being constructed and arranged to receive a demodulated message from the interpreter and to receive position measurement results from the signal conditioner.

6. The measuring device according claim 1, wherein said light source is arranged to emit the output light beam so as to have a line-shaped cross section and wherein said detector is a line shaped detector.

7. The measuring device of claim 1, wherein said housing comprises a holder suitable for attaching the measuring device to a shaft.

8. The measuring device of claim 1, wherein said measuring device further comprises an inclinometer arranged to indicate an angular position of an object to which the measuring device is attached.

9. A system for alignment of mechanical parts comprising:
   a first measuring device having a first housing comprising:
      a first light source structured and arranged to be capable of generating an output light beam that is modulated according to a modulation scheme for information transmission;
      a first incident light beam detector;
      a first interpreter connected to the first incident light beam detector, the first interpreter being structured and arranged to be capable of demodulating an incident light beam as received by the first incident light beam detector; and
      a first signal conditioner connected to the first incident light beam detector, the first signal conditioner being constructed and arranged so as to be capable of extracting a position of impingement of the incident light beam on a surface of the detector; and
   a second measuring device having a second housing comprising:
      a second light source structured and arranged to be capable of generating a second output light beam that is modulated according to a modulation scheme for information transmission;
      a second incident light beam detector;
      a second interpreter connected to the second incident light beam detector, the second interpreter being structured and arranged to be capable of demodulating an incident light beam as received by the second incident light beam detector; and
      a second signal conditioner connected to the second incident light beam detector, the second signal conditioner being constructed and arranged so as to be capable of extracting a position of impingement of the incident light beam on a surface of the detector; wherein
   each of the first and second measuring devices is structured so that the first and second measuring devices can be positioned with respect to one another such that the detector of said first measuring device can detect said output light beam transmitted by the light source of said second measuring device, and such that the detector of said second measuring device can detect said output light beam emitted by the light source of said first measuring device; and wherein the system further comprises:
   a user interface, said user interface being connected to said first measuring device via a bidirectional communication connection, said user interface comprising a user interface processor connected to a display; and wherein
   the second measuring device is a slave measuring device being arranged to communicate with said a user interface processor via said first measuring device.

10. The system of claim 9, wherein said user interface processor is constructed and arranged to analyse position measurement results obtained via the detectors of said first and second measurement devices.

11. The system of claim 10, wherein said further processor is further constructed and arranged to perform vibration analysis.

12. The system of claim 9, wherein said bidirectional communication connection is a wireless connection.

13. A system for aligning a first mechanical part and a second mechanical part, said system comprising:
a first measuring device attachable to the first part; and
a second measuring device attachable to the second part;
said first measuring device comprising
a connection for communication with a user interface, a first laser transmitter and a first detector, said second measuring device comprising
a second laser transmitter and a second detector, the first and second measuring devices being structured so that the first and second measuring devices can be positioned with respect to one another such that said first detector receives a laser beam transmitted by said second laser transmitter and said second detector receives a laser beam transmitted by the first laser transmitter, said first and second detectors being constructed and arranged to, upon detection of a corresponding said laser beam, output first and second detection signals, respectively, and wherein said first laser transmitter is constructed and arranged to be capable of transmitting a laser beam modulated according to a modulation scheme suitable for information transmission; and said second measuring device comprises a demodulator connected to an output of the second detector, said demodulator being arranged to demodulate a second detection signal which is modulated according to said modulation scheme; and wherein
said first measuring device is adapted to, when receiving on said connection a message intended for said second measuring device, transmit said message to said second measuring device via said first laser transmitter.

14. The system according to claim 13, wherein, the first laser transmitter is constructed and arranged to be able to perform transmission in at least two different transmission modes, wherein in a first of the transmission modes, the transmitted laser beam is suited for position sensing, and in a second of the transmission modes, the laser beam is modulated according to said modulation scheme for information transmission.

15. The system according to claim 13, wherein the first laser transmitter is constructed and arranged to transmit a laser beam modulated according to a modulation scheme suitable for information transmission and position sensing.

16. The system according to claim 15, wherein said second measuring device further comprises a signal conditioner connected to the output of the second detector and a processor connected to the output of said signal conditioner, said signal conditioner being constructed and arranged to extract a signal responsive to the position of the laser beam on a surface of the second detector, said signal being in a format readable by the processor; and said signal conditioner and said demodulator can operate simultaneously.

17. The system according to claim 13, wherein said first measuring device further comprises a first processor and a first laser driver, said first laser driver being arranged to receive, from the first processor, instructions regarding the transmission of a laser beam, to generate an anode current in response to said instruction and to feed said anode current to a laser diode of the first laser transmitter.

18. An apparatus for static alignment of two shafts, comprising the system of claim 13, wherein: the first mechanical part is a first shaft to which the first measuring device is attached; the second mechanical part is a second shaft to which the second measuring device is attached; and the apparatus further comprises a processor comprising a user interface, the processor being connected via a bidirectional connection to one of the first and second measuring devices, said processor being arranged to receive, via said bidirectional connection, results from measurements performed by the first and second measuring devices.

19. The apparatus of claim 18, wherein said processor is further constructed and arranged to perform vibration analysis.

20. A method for aligning a first mechanical part and a second mechanical part comprising the steps of:
providing a first measuring device attachable to the first part, and a second measuring device attachable to the second part, the first measuring device comprising a first light source and a first detector, the second measuring device comprising a second light source and a second detector and a connection for communication to a user interface;
emitting, from the first light source, a first light beam modulated to carry information;
detecting, in the second detector, the first light beam;
generating a first detector output signal responsive to said detecting; demodulating the first detector output signal and retrieving said information;
transmitting said retrieved information on said connection for communication to said user interface.

21. The method of claim 20, said method further comprising extracting, from said first detector output signal, a position of impingement of the first light beam on a surface of the second detector.

22. The method of claim 21, wherein said method further comprises receiving, in one of the first and second measuring devices, measurement instructions from a processor; and sending the results of said step of extracting to said processor.

23. The method according to claim 20, wherein said method further comprises emitting, from the first light source, a second light beam, said second light beam being modulated so as to be suitable for position measurement; detecting, in the second detector, impingement of the second light beam on the surface of the second detector; generating a second detector output signal responsive to said detecting of the impingement; and extracting, from the second detector output signal, a position of impingement of said second light beam on the surface of the second detector.

24. The method of claim 20, wherein said first light source is a laser transmitter and said first light beam is a laser beam.

25. The method according to claim 24, wherein said first measuring device further comprises a first processor and a first laser driver, said method further comprising receiving, in the first laser driver from the first processor, an instruction to transmit said information; generating, in said laser driver, an anode current modulated to cause, when fed to the first laser transmitter, a laser diode of the first laser transmitter to emit said first laser beam; and feeding said anode current to said laser diode.

* * * * *

(12) EX PARTE REEXAMINATION CERTIFICATE (7742nd)
United States Patent
Foley

(10) Number: US 7,301,616 C1
(45) Certificate Issued: Sep. 14, 2010

(54) METHOD AND APPARATUS FOR OBJECT ALIGNMENT

(75) Inventor: David Foley, Bochum (DE)

(73) Assignee: SPM Instrument AB, Strangnas (SE)

Reexamination Request:
No. 90/010,303, Oct. 29, 2008

Reexamination Certificate for:
Patent No.: 7,301,616
Issued: Nov. 27, 2007
Appl. No.: 11/073,866
Filed: Mar. 8, 2005

(30) Foreign Application Priority Data

Mar. 8, 2004 (SE) ............................................... 0400586

(51) Int. Cl.
*G01C 1/00* (2006.01)

(52) U.S. Cl. .................................................... 356/141.3
(58) Field of Classification Search ................ 356/141.3
See application file for complete search history.

(56) References Cited

U.S. PATENT DOCUMENTS

| 4,518,855 A | 5/1985 | Malak |
| 4,603,975 A | 8/1986 | Cinzori |
| 4,732,472 A | 3/1988 | König et al. |
| 6,941,080 B2 * | 9/2005 | Kasper et al. ............... 398/186 |

FOREIGN PATENT DOCUMENTS

WO 03/062770 A1 7/2003

* cited by examiner

*Primary Examiner*—Jimmy G Foster

(57) ABSTRACT

The present invention relates to a method and apparatus for alignment of two mechanical parts. An inventive measuring device has a housing comprising a light source and a detector for detection of light beams. The light source is capable of transmitting a light beam modulated according to a modulation scheme for information transmission. The output of said detector is connected to an interpreter arranged to demodulate a detected light beam and to a signal conditioner arranged to extract the position of impingement of a detected light beam on the detector surface.

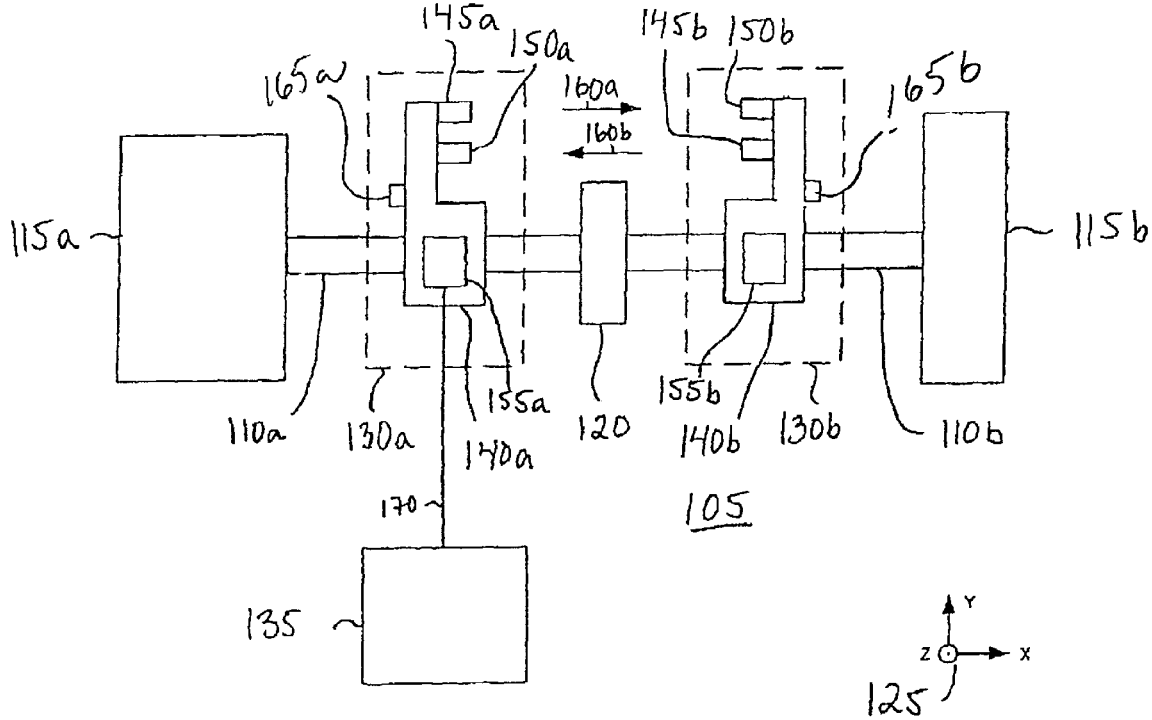

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-17, 20, 21 and 23-25 are cancelled.

Claims 18 and 22 are determined to be patentable as amended.

Claim 19, dependent on an amended claim, is determined to be patentable.

New claims 26-28 are added and determined to be patentable.

18. An apparatus for static alignment of two shafts, comprising [the] *a* system [of claim 13,] *for aligning a first mechanical part and a second mechanical part, said system comprising:*
  *a first measuring device attachable to the first part; and*
  *a second measuring device attachable to the second part;*
    *said first measuring device comprising*
      *a connection for communication with a user interface, a first laser transmitter and a first detector, said second measuring device comprising*
      *a second laser transmitter and a second detector, the first and second measuring devices being structured so that the first and second measuring devices can be positioned with respect to one another such that said first detector receives a laser beam transmitted by said second laser transmitter and said second detector receives a laser beam transmitted by the first laser transmitter, said first and second detectors being constructed and arranged to, upon detection of a corresponding said laser beam, output first and second detection signals, respectively, and wherein said first laser transmitter is constructed and arranged to be capable of transmitting a laser beam modulated according to a modulation scheme suitable for information transmission; and said second measuring device comprises a demodulator connected to an output of the second detector, said demodulator being arranged to demodulate a second detection signal which is modulated according to said modulation scheme; and*
  *wherein said first measuring device is adapted to, when receiving on said connection a message intended for said second measuring device, transmit said message to said second measuring device via said first laser transmitter, and* wherein: the first mechanical part is a first shaft to which the first measuring device is attached; the second mechanical part is a second shaft to which the second measuring device is attached; and the apparatus further comprises a processor comprising a user interface, the processor being connected via a bidirectional connection to one of the first and second measuring devices, said processor being arranged to receive, via said bidirectional connection, results from measurements performed by the first and second measuring devices.

22. [The] *A* method [of claim 21, wherein said method further comprises] *for aligning a first mechanical part and a second mechanical part comprising the steps of:*
  *providing a first measuring device attachable to the first part, and a second measuring device attachable to the second part, the first measuring device comprising a first light source and a first detector, the second measuring device comprising a second light source and a second detector and a connection for communication to a user interface;*
  *emitting, from the first light source, a first light beam modulated to carry information;*
  *detecting, in the second detector, the first light beam;*
  *generating a first detector output signal responsive to said detecting;*
  *demodulating the first detector output signal and retrieving said information;*
  *transmitting said retrieved information on said connection for communication to said user interface;*
  extracting, from said first detector output signal, a position of impingement of the first light beam on a surface of the second detector;
  receiving, in one of the first and second measuring devices, measurement instructions from a processor; and
  sending the results of said step of extracting to said processor.

26. *A system for alignment of first and second shafts comprising:*
  *a first measuring device having a first housing comprising:*
    *a first light source structured and arranged to be capable of generating an output light beam that is modulated according to a modulation scheme for information transmission;*
    *a first incident light beam detector;*
    *a first interpreter connected to the first incident light beam detector, the first interpreter being structured and arranged to be capable of demodulating an incident light beam as received by the first incident light beam detector;*
    *a first signal conditioner connected to the first incident light beam detector, the first signal conditioner being constructed and arranged so as to be capable of extracting a position of impingement of the incident light beam on a surface of the detector;*
    *a first processor configured to generate an instruction to the first light source for modulation of its output light beam, and connected to the first interpreter and first signal conditioner; and*
    *a first holder attached to the housing and structured to removably attach the first measuring device to the first shaft;*
  *a second measuring device having a second housing comprising:*
    *a second light source structured and arranged to be capable of generating a second output light beam that is modulated according to a modulation scheme for information transmission;* a second incident light beam detector;

a second interpreter connected to the second incident light beam detector, the second interpreter being structured and arranged to be capable of demodulating an incident light beam as received by the second incident light beam detector;

a second signal conditioner connected to the second incident light beam detector, the second signal conditioner being constructed and arranged so as to be capable of extracting a position of impingement of the incident light beam on a surface of the detector;

a second processor configured to generate a message to the second light source for modulation of its output light beam, and connected to the second interpreter and second signal conditioner; and a second holder attached to the housing and structured to removably attach the second measuring device to the second shaft;

wherein each of the first and second measuring devices is structured so that the first and second measuring devices can be positioned with respect to one another such that the detector of said first measuring device can detect said output light beam transmitted by the light source of said second measuring device, and such that the detector of said second measuring device can detect said output light beam emitted by the light source of said first measuring device; and wherein the system further comprises:

a user interface, said user interface being connected to said first measuring device via a bidirectional communication connection, said user interface comprising a user interface processor connected to a display; and wherein the second measuring device is a slave measuring device being arranged to communicate with said user interface processor via said first measuring device so that the second measuring device is responsive to the instruction transmitted from the first measuring device.

27. A system as claimed in claim 26 wherein the first signal conditioner is configured to receive a first detection signal from the first light beam detector and to generate first position data based on the first detection signal, the first processor configured to receive the first position data and to generate a display on the user interface based on the first position data.

28. A system as claimed in claim 27 wherein the first processor is configured to generate the instruction to direct the second measuring device to measure the position of the first light beam at the second light beam detector, and the first light source is configured to modulate the first light beam based on the instruction, and the second interpreter is configured to demodulate the first light beam from the second light beam detector and to provide the instruction to the second processor, and, in response to the instruction, the second processor receives second position data from the second signal conditioner and instructs the second light source to modulate the second light beam with the message containing the second position data, the second light source configured to generate and output the second light beam modulated with the second position data, and the first light beam detector is configured to detect the second light beam and generate the first detection signal, and the first interpreter is configured to demodulate the second position data and to provide the second position data to the first processor, the first processor configured to output the first and second position data to the user interface via the connection, the user interface generating a display of relative alignment of the first and second shafts based on the first and second position data.

* * * * *